United States Patent
Piedra Camacho et al.

(10) Patent No.: US 12,057,968 B2
(45) Date of Patent: Aug. 6, 2024

(54) SYSTEM AND METHOD FOR GENERATING INTERNAL TRAFFIC IN A SWITCH

(71) Applicant: Hewlett Packard Enterprise Development LP, Houston, TX (US)

(72) Inventors: Rodolfo José Piedra Camacho, Cartago (CR); Sergio Jesus Guillen Hernandez, San Jose (CR); Carolina Vargas Basilio, San Jose (CR); Claudio Enrique Víquez Calderón, San Jose (CR); Alejandro Porras Murillo, San Jose (CR); Jose David Murillo, San Jose (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 455 days.

(21) Appl. No.: 17/387,371

(22) Filed: Jul. 28, 2021

(65) Prior Publication Data

US 2023/0035653 A1    Feb. 2, 2023

(51) Int. Cl.
*H04L 12/46* (2006.01)
*H04L 45/74* (2022.01)
*H04L 47/62* (2022.01)

(52) U.S. Cl.
CPC .......... *H04L 12/4641* (2013.01); *H04L 45/74* (2013.01); *H04L 47/62* (2013.01)

(58) Field of Classification Search
CPC ..... H04L 12/4641; H04L 45/74; H04L 47/62; H04L 12/4645; H04L 49/00
See application file for complete search history.

(56) References Cited

U.S. PATENT DOCUMENTS

| | | | | |
|---|---|---|---|---|
| 2007/0076625 A1* | 4/2007 | Tahara | .................. | H04L 69/166 370/428 |
| 2013/0058337 A1* | 3/2013 | Eddleston | .......... | H04Q 11/0067 370/390 |
| 2015/0222443 A1* | 8/2015 | Basso | ..................... | H04L 47/29 370/230 |
| 2016/0087809 A1* | 3/2016 | Schmidt | .................. | G06F 16/27 370/390 |
| 2020/0134308 A1* | 4/2020 | Javadi | .................... | H04L 51/212 |
| 2021/0014001 A1* | 1/2021 | Yilmaz | ................... | H04L 45/74 |

* cited by examiner

*Primary Examiner* — Kibrom T Hailu
(74) *Attorney, Agent, or Firm* — Park, Vaughan, Fleming & Dowler LLP (57) ABSTRACT

One aspect of the instant application provides a system and method for generating internal traffic for a switch. During operation, the system configures a replication list comprising a plurality of replication entries, with a respective replication entry corresponding to a destination port on the switch. The system generates a seed packet to be replicated for each replication entry in the replication list, with a destination address of a respective replicated packet corresponding to a replication entry. All replicated packets are associated with a virtual local-area network (VLAN) reserved for the internal traffic. The system then forwards the replicated packets along with external packets received by the switch to corresponding destination ports on the switch.

16 Claims, 6 Drawing Sheets

SYSTEM AND METHOD FOR GENERATING INTERNAL TRAFFIC IN A SWITCH

BACKGROUND

Field

This disclosure is generally related to determining congestion state and connectivity in a multi-node switch system. More specifically, this disclosure is related to a system and method for generating internal traffic in a switch to determine states of the queues and connectivity among nodes in the switch.

BRIEF DESCRIPTION OF THE FIGURES

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

In a multi-node switch implementing virtual output queuing (VOQ), the physical buffer of each input port maintains a separate virtual queue for each output port such that congestion on an output port only blocks the virtual queue for this particular output port. The queuing algorithm or the scheduling of the packets requires the queue state of the destination to be propagated to the source nodes. For a large scale switch, the number of queues that a line card needs to monitor can be huge. For example, for a switch chassis having ten line cards, with each line card handling up to 48 ports and with up to eight queues per port, a line card may need to monitor 3840 queues at any given time. Each of these queues can suffer from fabric connectivity issues, latency problems, or congestion. To ensure a good operating condition for the chassis, a monitor mechanism that can account for the granularity of the queues is needed.

One approach is to have the CPU on each line card generate packets for transmission within the switch and monitor the delivery of these internal packets. However, given the scale of the queues in large switches, such an approach is inefficient. Using the previous switch with ten line cards as an example, each line card CPU needs to generate and transmit packets to 3840 destinations, which would consume large amounts of CPU resources, leaving fewer CPU cycles for other tasks. Moreover, the software-based solution is often too slow to meet the almost real-time demands in hardware to efficiently detect congestion problems. A hardware solution is required in order to efficiently monitor latency and congestion within the switch.

In one example, existing hardware replication units in a switch can be used to generate packets transmitted internally in the switch. In conventional switches, a replication unit is mostly used for purposes of IP multicasting and layer 2 (L2) replication. In both cases, the replication unit replicates packets received by the switch from external devices and the replicated packets are transmitted to external destinations. Here, the replication unit can be modified and configured to operate in a traffic-generation mode. More specifically, the replication unit can maintain a replication list that comprises a plurality of replication entries, with each replication entry corresponding to a destination (i.e., a particular port on a particular node) on the switch. For each replication entry, the replication unit can continuously replicate a single seed packet for each queue associated with the replication entry. For example, if a replication entry (e.g., a particular port at a particular node) has multiple queues that are active (e.g., eight priority queues), the replication unit can receive multiple seed packets (one per queue) and replicate each seed packet for the replication entry. If the replication list has 100 entries, each seed packet will be replicated 100 times; and if each replication entry has eight queues, a total of 800 packets will be generated. The destination of each packet can be controlled and defined. According to one aspect of the application, the destinations of the generated packets can have the form {node, port, queue}, effectively targeting all possible destinations of a given source node.

Figure 1:
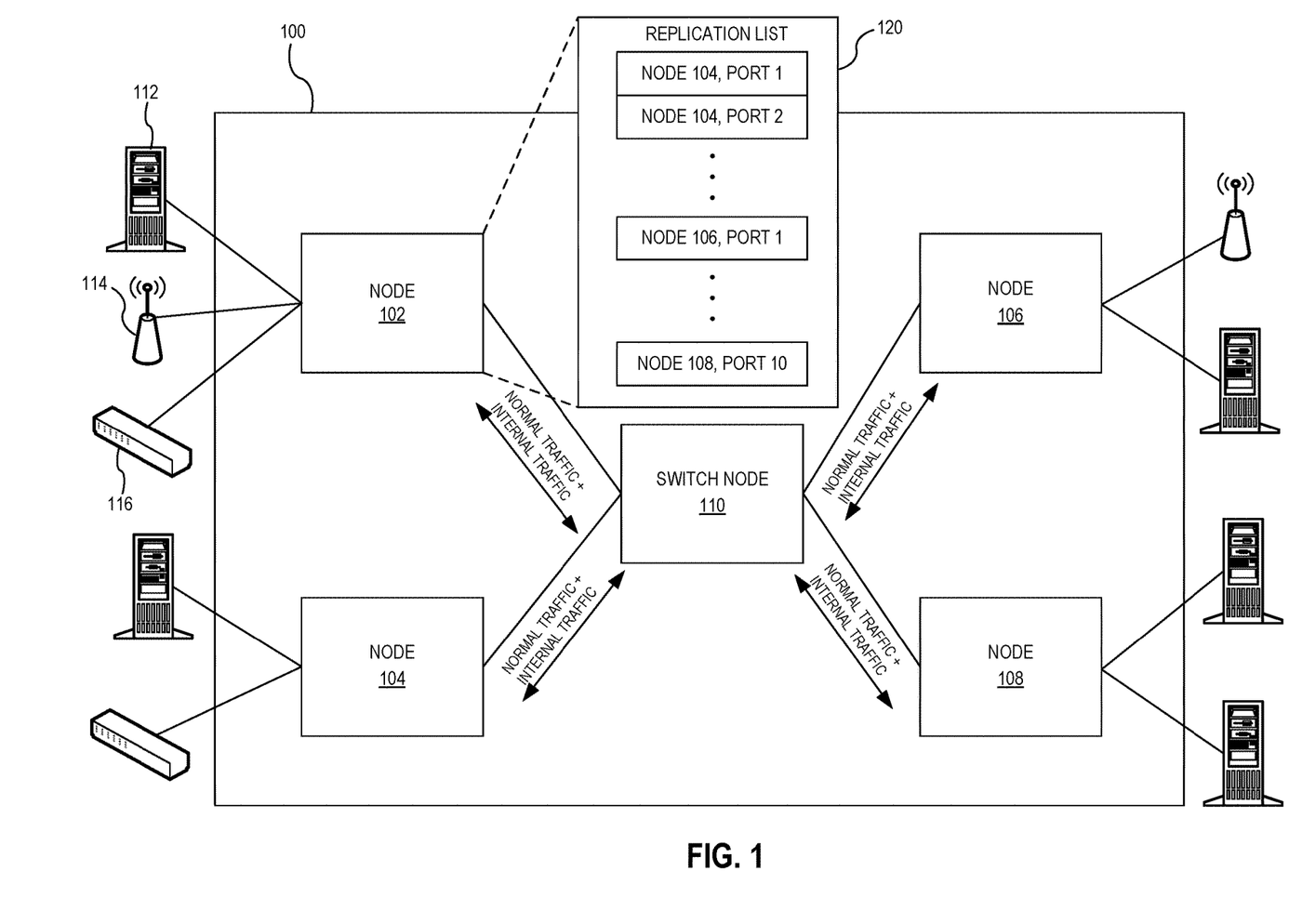
FIG. 1 illustrates an exemplary multi-node switch system, according to one aspect of the instant application.

FIG. 1 illustrates an exemplary multi-node switch system, according to one aspect of the instant application. A multi-node switch system 100 can include a number of nodes (e.g., nodes 102-108) interconnected via a switch node 110. In one example, multi-node switch system 100 can include a switch chassis, nodes 102-108 can include line cards, with each line card having a plurality of network ports; and switch node 110 can include a switch card. The network ports of each line card can be coupled to external devices (e.g., computers, wireless access points, other switches, etc.). For example, node 102 is coupled to external devices 112, 114, and 116.

FIG. 1 also shows that each node maintains a replication list that can be used to replicate packets. For example, node 102 maintains a replication list 120, which include a plurality of entries. More specifically, a replication unit on each node maintains the replication list. Each replication entry in the replication list corresponds to a distinct packet destination for the node, the packet destination being a particular port on a particular node. When the replication unit is configured to operate in the traffic-generation mode, it can continuously replicate a seed packet (which can be generated by the CPU of the node) for each replication entry in the replication list. In one example, the replication unit can be configured to go through the replication list and replicate the seed packet, one at a time at a predetermined rate, for each entry in the list, and to repeat the process continuously until it is interrupted by, for example, a user command.

Note that the internal traffic generated by the replication unit when it is operating in the traffic-generation mode does not interfere with normal traffic, although a certain amount of bandwidth would be consumed by the internal traffic. The internally generated packets (also referred to as internal packets) can be inserted into the packet-processing pipeline and will be processed the same way as normal packets received from external devices, except that these internally replicated packets will not leave the switch system. In other words, these internal packets will be forwarded to their corresponding destinations (e.g., a particular queue of a particular port on a particular node) on the switch like normal traffic, as shown by the double headed arrows in FIG. 1. After the states of delivery (e.g., the number of packets actually arrive at their corresponding destinations) of these internal packets are determined (e.g., by using a number of counters), these internal packets will be dropped at the destination port. Note that the generation rate of the internal packets can be configurable. In one example, the generation rate of the internal packets can be adjusted based on the current load of the switch system to avoid overconsumption of the bandwidth by the internal traffic. For example, when the switch system experiences lighter traffic, the generation rate of the internal packets can be faster (e.g., one packet is generated every millisecond); on the other hand, when the switch system experiences heavier traffic, the generation rate of the internal packets can be slower (e.g., one packet is generated every ten milliseconds). In one example, the bandwidth consumed by the internal traffic can be a predetermined fraction (e.g., between 0.1% and 1%) of the available bandwidth.

The congestion state of the switch system can be determined based on the delivery states of the internal packets (e.g., which packets arrived at the destination and which packets are dropped because the destination queue is full). Because the internal packets target each active queue, the congestion state of the switch system can be determined with a granularity at the per-queue level. Moreover, the delivery states of the internal packets can also be used to determine the connectivity among all nodes in the switch system. For example, consistently dropped packets may indicate a connection loss.

Figure 2:
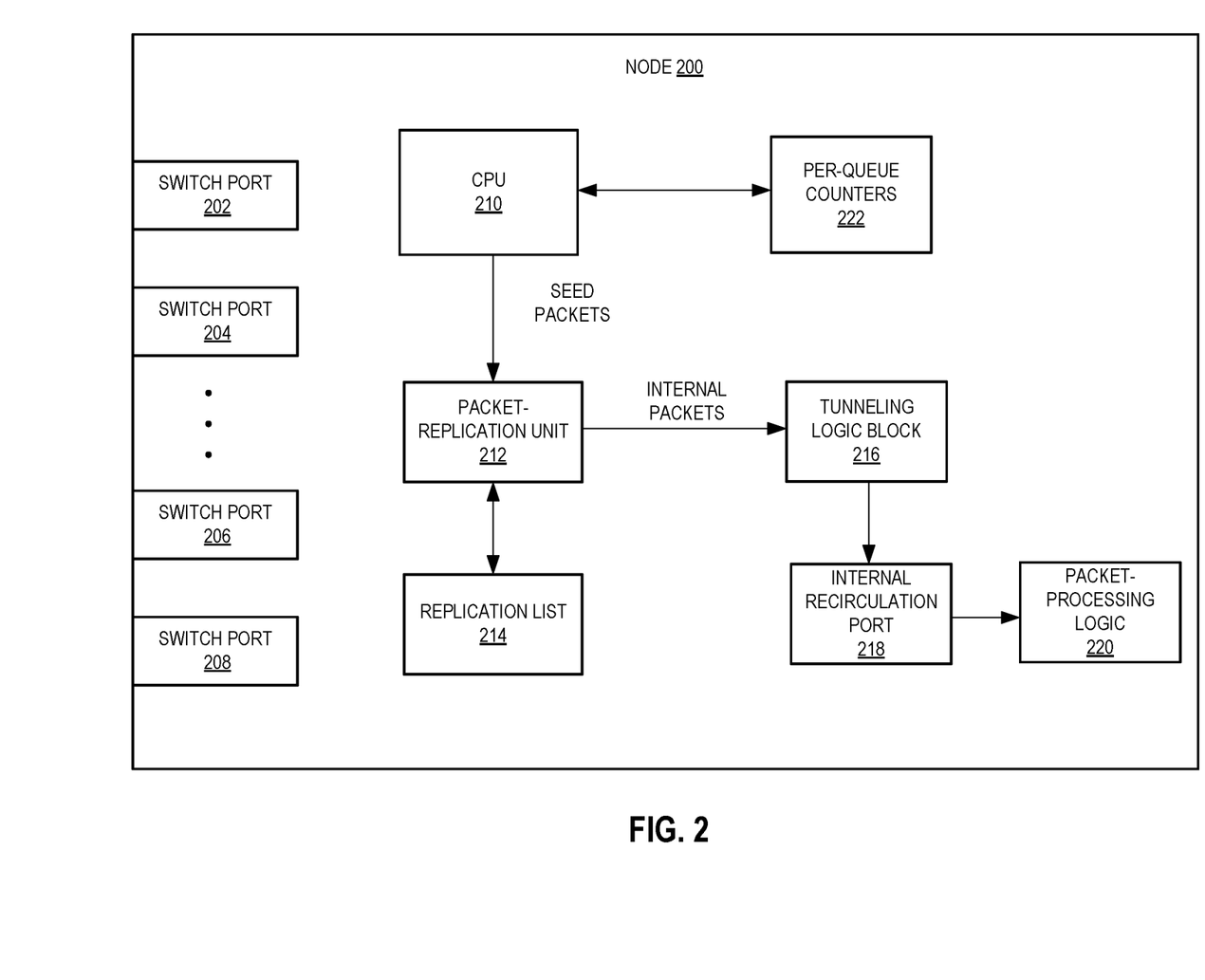
FIG. 2 illustrates a block diagram of an exemplary node in the multi-node switch system, according to one aspect of the application.

FIG. 2 illustrates a block diagram of an exemplary node in the multi-node switch system, according to one aspect of the application. In FIG. 2, node 200 can be part of a multi-node switch system. For example, node 200 can be a line card inserted into a switch chassis that comprises multiple line cards. Node 200 can include a plurality of switch ports (e.g., ports 202-208), a CPU 210, a packet-replication unit 212, a replication list 214, a tunneling logic block 216, an internal recirculation port 218, packet-processing logic 220, and a number of per-queue counters 222.

Node 200 can receive packets from and send packets to external devices (e.g., computers, wireless access points, other switches, etc.) via the switch ports. Switch ports on node 200 can be coupled to each other and switch ports of different nodes.

CPU 210 can sometimes referred to as a line card CPU and is often responsible for handling the control plane traffic. According to one aspect of this application, CPU 210 can be responsible for generating seed packets that are to be replicated and forwarded to various switch ports in the multi-node switch system. In one example, the multi-node switch system can implement the VOQ architecture, and CPU 210 can generate different seed packets for different types of output queues. For example, the queues of a switch port can be organized based on priority, and CPU 210 can generate a different seed packet for each priority queue. In a further example, each port can support up to eight priority queues, and CPU 210 can generate, accordingly, eight different seed packets, one for each priority queue.

According to one aspect of this application, to reduce the bandwidth consumed by the internal traffic, the size of each seed packet can be kept small. For example, the minimum size of the packet payload can be one byte. When generating a seed packet, CPU 210 can add an internal header to the packet, with the internal header defining a number of properties associated with the packets. In one example, the internal header can define a replication group, priority, and a special virtual local-area network (VLAN). The replication group refers to packet-replication list 214, which can include a plurality of replication entries. The priority refers to the type of queue associated with the seed packet. The special VLAN is a VLAN reserved for the internal traffic. All internal packets are associated with this special VLAN.

Packet-replication unit 212 can be responsible for replicating the seed packets generated by CPU 210. Packet-replication unit 212 can maintain a replication list 214, which can be implemented using hardware logic. Replication list 214 can be similar to replication list 120 shown in FIG. 1 and can include a number of replication entries, with each entry specifying a {node, port} combination. The number of replication entries in replication list 214 can be the product of the number of nodes and the number of ports on each node. For example, if there are 10 line cards in the switch system and each line card has 48 ports, replication list 214 will include up to 10×48=480 entries. Because not all ports in the switch system are configured or activated, not all replication entries in replication list 214 are enabled. In one example, only entries corresponding to configured ports are enabled. In another example, a system administrator can manually enable or disable entries in replication list 214. As discussed previously, packet-replication unit 212 can replicate a seed packet for each enabled replication entry in replication list 214.

Upon receiving a seed packet from CPU 210, packet-replication unit 212 can remove the internal header of the seed packet but the priority and VLAN information indicated by the internal header will be preserved and used for replicating the packet. For example, priority tagging can be used to associate the replicated packets with the particular type of priority queue. The VLAN is a special VLAN reserved for the internal traffic and can be denoted as VLAN_R in this disclosure. The priority tag in combination with the destination MAC address can map a replicated packet to a particular queue of a particular port on a particular node. This way, internal packets can be generated for all possible active destinations on the switch. Note that the destination ports are not members of the special VLAN, meaning that the internal packets will be dropped at the destination ports, without going out of the switch system.

Tunneling logic block 216 can be responsible for creating a number of tunnel entries, one for each replication entry. The number of tunnel entries can be the same as the number of entries in replication list 214. All tunnels can use the same special VLAN (i.e., VLAN_R) for their encapsulation, with the destination media access control (MAC) address for each tunnel entry corresponding to a {node, port) combination. More specifically, the destination MAC address of a tunnel instance corresponds to a particular replication entry in replication list 214. In one example, the destination MAC address can have the following pattern: X:X:X:X:NODE: PORT, where NODE and PORT correspond to, respectively, the node identifier and the port identifier. In a further example, the destination MAC address can be 08:00:09:00:NODE:PORT. Other formats can also be possible as long as the {node, port} combination can be uniquely identified. The scope of this disclosure is not limited by the format of the destination MAC address of the replicated packets. According to one aspect, all tunnels point to a same destination, which can be internal recirculation port 218.

Internal recirculation port 218 is an internal port on node 200. In other words, this port is invisible to external devices. Internal recirculation port 218 can be responsible for inserting the internal packets into the packet-processing pipeline (i.e., packet-processing logic 220). This way the internal packets can be processed in a way similar to the external packets, which are packets received by node 200.

Per-queue counters 222 can be responsible for counting the number of internal packets received for each queue on node 200. For example, if there are 48 ports on node 200 and each port supports eight queues, then there will be 384 counters, one for each queue. Note that, because all internal packets are associated with the special VLAN (VLAN_R), per-queue counters 222 can be configured to only count packets associated with the special VLAN. According to one aspect, per-queue counters 222 can be monitored by a control application running in CPU 210, which can use this information to check switch card connectivity and possible congestion from one node to another. More specifically, per-queue counters 222 can provide congestion information for each queue. Such information can be used to determine whether a queue (e.g., a VOQ) is dropping packets because it is full or saturated. The congestion information can also be used to determine whether the utilization rate of a queue is at a desired level. In one aspect, if the utilization rates of one or more queues are not at the desired levels, the control and management logic in the switch system can take action, such as adjusting the transmission rates of certain ports, rebalancing traffic, or reconfiguring the replication list to target specific ports.

Figure 3:
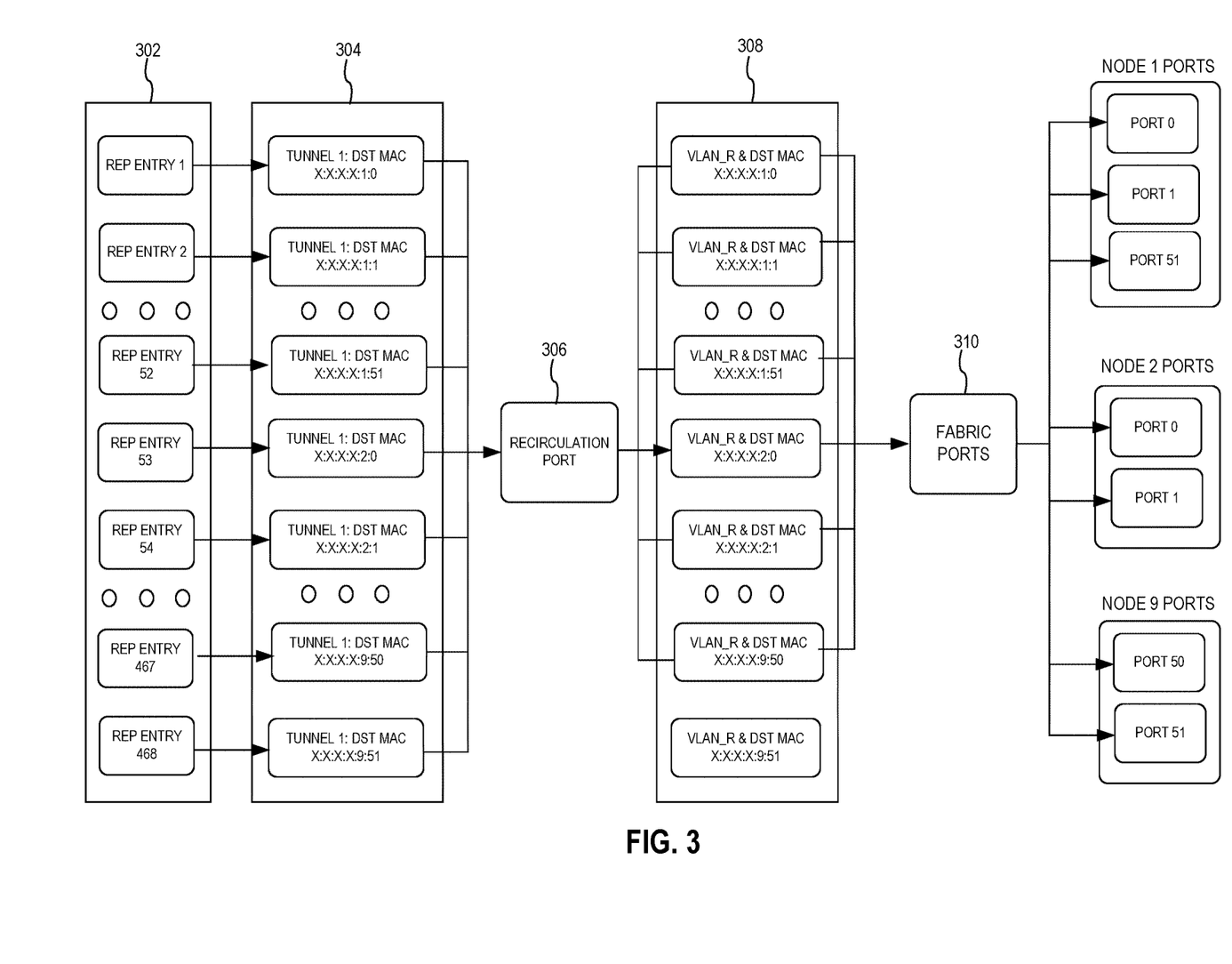
FIG. 3 illustrates exemplary configurations of a node in a multi-node switch system, according to one aspect of the instant application.

FIG. 3 illustrates exemplary configurations of a node in a multi-node switch system, according to one aspect of the instant application. In this example, it is assumed that there are a maximum of 10 nodes and each node can have up to 52 ports. FIG. 3 shows the configurations of Node 0.

In FIG. 3, a replication list 302, which is maintained by the replication unit on a node (e.g., a line card), can include a plurality of entries (e.g., 52×9=468 entries). The replication entries, when enabled, facilitate the replication unit to replicate seed packets. In one example, a replication entry can be enabled if the corresponding destination port is configured. For example, when Node 1, Port 0 is configured, replication entry 1 will be enabled. Moreover, if at any point a specific flow wants to be stopped (e.g., there is no longer the need to monitor a particular port), the corresponding replication entry in replication list 302 can be disabled, consequently stopping packet replication for the particular port.

Each replication entry points to a tunnel entry in a tunnel table 304, which can be maintained by the tunneling logic. The number of tunnel entries in tunnel table 304 is the same as the number of replication entries in replication list 302. Each tunnel entry can set the MAC address for each {node, port} combination. For example, replication entry 1 points to tunnel 1 that sets the MAC address for Node 1, Port 0. All tunnels use the special VLAN (VLAN_R) for encapsulation and they all point to a recirculation port 306. As shown in FIG. 3, the difference between different tunnel entries is the destination MAC address used to identify each destination (i.e., each unique {node, port} combination). In the example shown in FIG. 3, the destination MAC address can have the following format: X:X:X:X:NODE:PORT.

Recirculation port 306 tags all recirculated packets using the VLAN ID of the special VLAN such that the recirculated packets can preserve this special VLAN. According to one aspect, when configuring recirculation port 306, the control software running in the line card CPU can create a set of L2 entries for an L2 table 308. The number of created L2 entries can be the same as the number of replication entries in replication list 302. In FIG. 3, replication list 302 has 468 entries, and L2 table 308 also has 468 entries. Each L2 entry matches the special VLAN (i.e., VLAN_R) and the destination MAC address (e.g., in the pattern of 08:00:09:00:NODE:PORT) to the respective packet destination specified by the {node, port} combination. Moreover, because each packet is also tagged with priority based on which seed packet is used for replication, the packets will in fact target distinctive queues (i.e., each unique {node, port, queue} combination). The packets are sent to corresponding fabric ports 310 based on the {node, port} combination, such as {node 1, port 0} or {node 9, port 51}.

Figure 4:
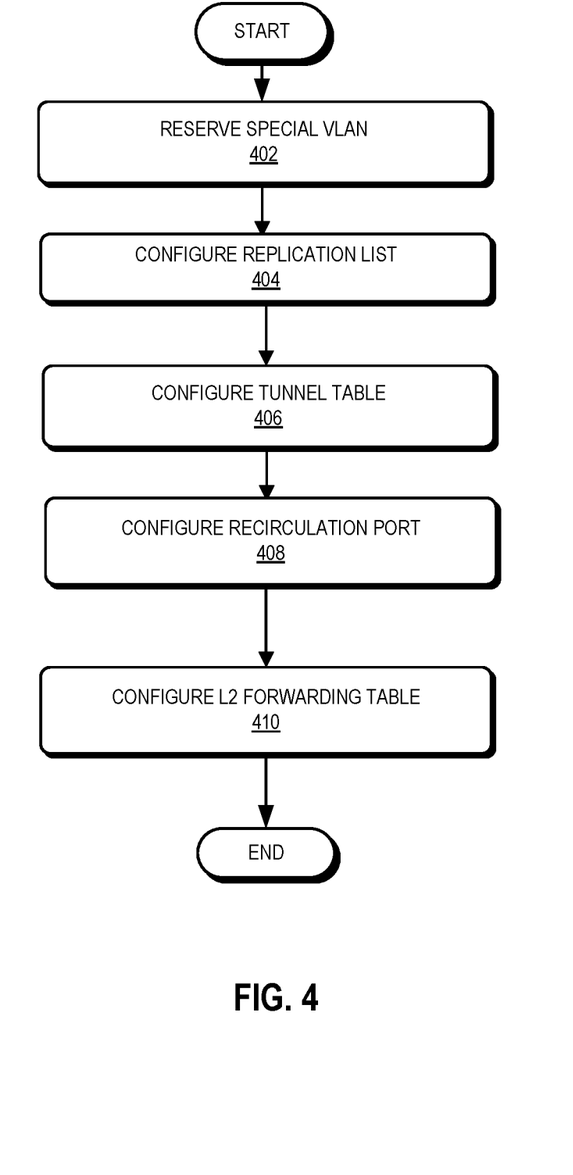
FIG. 4 provides a flowchart illustrating an exemplary process for configuring a switch system to facilitate generation of internal traffic, according to one aspect of the application.

FIG. 4 provides a flowchart illustrating an exemplary process for configuring a switch system to facilitate generation of internal traffic, according to one aspect of the application. The switch system can include multiple line cards, with each line card having multiple ports. During operation, the system reserves a special VLAN for the internal traffic (operation 402). All internal packets will be transmitted on this special VLAN, which is referred to as VLAN_R in this disclosure. The system then configures a replication list for each line card (operation 404). Entries in the replication list correspond to destination ports in the switch system, with each entry corresponding to a unique {node, port} or {line card, port} combination. In one example, the number of entries in the replication list equals the total number of ports with which the line card is communicating. For example, if a particular line card is communicating with nine line cards in the switch, with each line card having 52 ports, then the number of entries in the replication list is 52×9=468. Configuring the replication list can include enabling certain entries and/or disabling certain entries in the list. For example, an entry can be enabled when a corresponding port is configured and ready for transmitting and receiving packets. Similarly, when it is no longer necessary to monitor a particular port, its corresponding entry in the replication list can be disabled. Once the replication list is configured, a replication unit on the line card can replicate a received seed packet for each enabled entry in the list.

In addition to configuring the replication list, the system can also configure a tunnel table that comprises a number of tunnel entries (operation 406). The number of entries in the tunnel table can equal the number of entries in the replication list. More specifically, each entry in the replication list can be in charge of sending packets (i.e., packets generated for the entry) to a unique tunnel. All tunnels use the special VLAN (i.e., VLAN_R) for their encapsulation, and all tunnels point to an internal recirculation port on the line card.

The system can further configure the recirculation port (operation 408). In one embodiment, the recirculation port can be configured to tag internal packets using the special VLAN, such that the recirculated packets preserve the VLAN information. Note that the destination ports of the recirculated packets are not members of the special VLAN, such that the recirculated packets will be dropped by their destination ports, without leaving the switch. The correctly configured recirculation port can insert the internal packets into the packet-processing pipeline to allow the internal packets to be processed in a way similar to packets received from external devices.

The system also configures an L2 forwarding table (operation 410). The number of entries in the L2 forwarding table can also equal the number of entries in the replication list. Each entry in the L2 forwarding table can map packets belonging to the special VLAN (which indicate that the packets are internal packets) and having a destination MAC following the pattern X:X:X:X:NODE:PORT to a destination specified by the unique {node, port} combination. In other words, a packet with a VLAN ID matching VLAN_R and a destination MAC address matching X:X:X:X:NODE:PORT will be sent to the specified port. Depending on the priority tagging, the packet may also be sent to the specific priority queue of that port. Each and every node in the switch system needs to be correctly configured in order to facilitate the successful generation and forwarding of the internal traffic.

Figure 5:
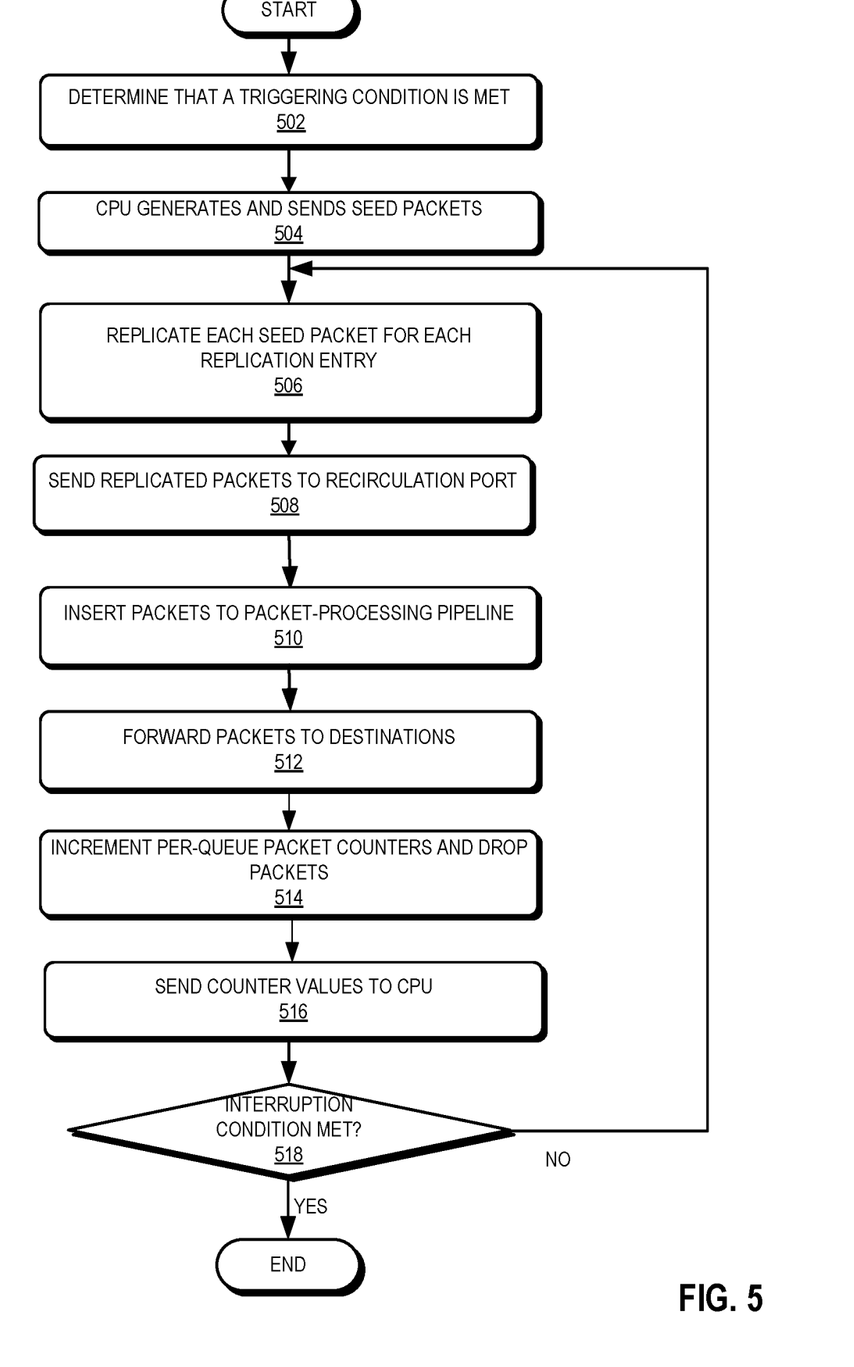
FIG. 5 provides a flowchart illustrating an exemplary process for monitoring queue states, according to one aspect of the application.

FIG. 5 provides a flowchart illustrating an exemplary process for monitoring queue states, according to one aspect of the application. During operation, the system determines that a triggering condition has been met (operation 502). The triggering condition can be the system administrator entering a command for congestion or connectivity monitoring. In one example, internal traffic generation can be part of the initialization process of the switch (e.g., as part of the built-in-self-test (BIST)), and the triggering condition can be the completion of certain other initialization operations. In a further example, the triggering condition can be a set of predetermined rules. One exemplary rule can be that the triggering condition is met if the overall congestion level of the network reaches a predetermined level. For example, if the network is experiencing packet loss, this per-queue congestion monitoring mechanism can be triggered.

Once the triggering condition is met, the line card CPU can generate a number of seed packets and send the seed packets to the replication unit on the line card (operation 504). More specifically, the number of seed packets depends on the number of queues supported by each port. For example, if each port supports eight priority queues, the line card CPU can generate eight seed packets, one for each queue. When generating the seed packets, the CPU can add an internal header to each packet, with the internal header including information such as VLAN, priority, and replication group. Note that the VLAN is the special VLAN reserved for the internal traffic, and the replication group identifies the replication list used to replicate the seed packet. The payload of each seed packet can be kept to a minimum (e.g., one byte).

Upon receiving the seed packets, the replication unit can go through the entire replication list and replicate each seed packet for each entry in the replication list (operation 506). When replicating a seed packet, the replication unit can remove and process the internal header to obtain information (e.g., VLAN and priority) included in the internal header. A packet replicated according to a particular replication entry can have its destination MAC address (which can be part of the packet header) set based on the particular replication entry. In one example, each replication entry defines a unique {node, port} combination, and the destination MAC address for the corresponding replicated packet can be in a pattern similar to: X:X:X:X:NODE:PORT, where the initial four octets are not defined and the last two octets indicate the node and port. In a further example, the destination MAC address can be 08:00:09:00:NODE:PORT. In addition to setting the destination MAC address, the replication unit can also add priority tagging to the replicated packet based on the internal header of the seed packet.

In one example, the replication unit can go through the replication list, one entry at a time, to replicate each seed packet for each entry. The rate of replication (i.e., the rate of generation of the internal packets) can be configured, either through a control algorithm running in the line card CPU or by a system administrator. To prevent the internal traffic from consuming too much bandwidth, according to one aspect, the replication rate can be adjusted based on the traffic load on the switch. In one example, the bandwidth occupied by the internal traffic can be a predetermined faction (e.g., between 0.1% and 1%) of the available bandwidth. In a further example, the replication rate will be decreased or increased, respectively, when the bandwidth consumed by the internal traffic is greater than a first threshold (e.g., 1%) or less than a second threshold (e.g., 0.1%).

The replication unit sends the replicated packets to a recirculation port on the line card (operation 508). In one example, the replication unit can send the replicated packets to the recirculation port via a number of tunnels, with each tunnel corresponding to each destination MAC address. All tunnels use the special VLAN for encapsulation. The recirculation port then inserts the replicated packets into the packet-processing pipeline (operation 510). While inserting the packets, the recirculation port can also tag the packets with the ID of the special VLAN to preserve the VLAN information. Inserting or recirculating the packets into the packet-processing pipeline can ensure that these internal packets are forwarded the same way as normal external packets. This also ensures that the generation and forwarding of the internal traffic does not interfere with normal traffic. Unlike certain schemes that require the packet-processing application-specific integrated circuit (ASIC) to stop normal forwarding operations to operate in a traffic-generation mode, this solution allows the packet-processing ASIC to operate normally by treating the internal packets and external packets the same.

The packet-processing ASIC subsequently forwards the packets to their corresponding destinations (operation 512). To do so, the packet-processing ASIC processes information included in the packet header, such as the VLAN ID, priority, and destination MAC address. A packet can be forwarded to a particular priority queue of a particular port on a particular line card based on the information included in the packet header. When a packet arrives at its destination (e.g., a particular port on a particular line card), a corresponding per-queue counter increments its value and the packet is dropped (operation 514). The packet is dropped because the destination port is not a member of the special VLAN. This way, the internal packets will not leave the switch. In one example, each line card maintains a number of per-queue counters, one for each queue. The counter values are sent to the line card CPU (operation 516), thus allowing the CPU to monitor and analyze the state of each queue. For example, based on the packet replication rate and the value of the per-queue counter, the CPU can determine, for each queue, the packet loss rate. The CPU can further determine whether the packet loss is due to the queue being full or saturated. Moreover, the packet loss rate of a particular queue or port can also indicate to the CPU connectivity issues among the ports.

The internal traffic can be continuously generated and forwarded (e.g., since the initialization of the switch) to allow continuous monitoring of congestion and/or connectivity. However, according to one aspect, the system can also determine if an interruption condition is met (operation 518). If so, the process ends, and there is no more replication of seed packets. If not, the replication units continue to replicate the seed packets (operation 506). The interruption condition can be the system administrator issuing a command to stop the internal traffic or the expiration of a predetermined timer.

Figure 6:
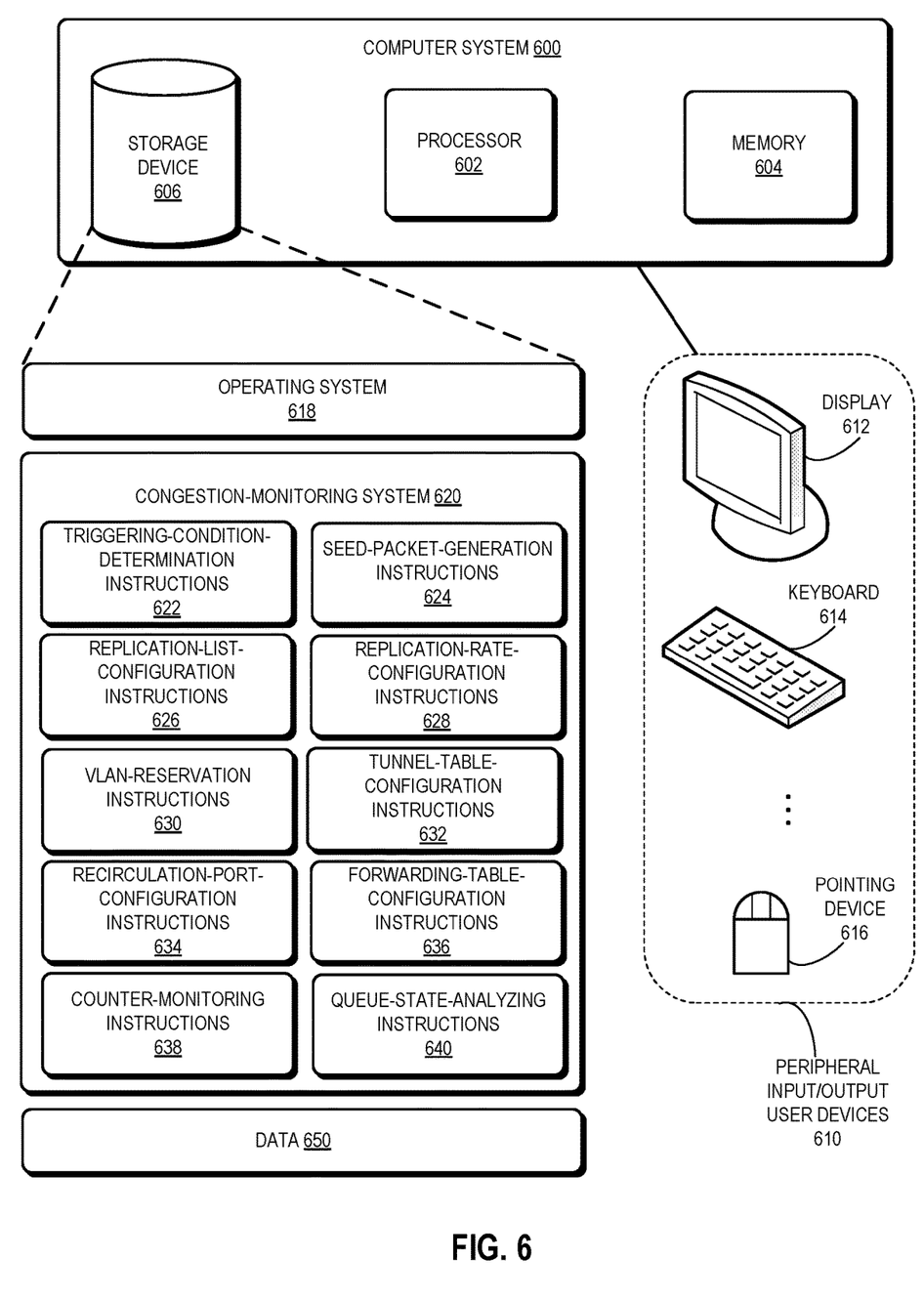
FIG. 6 illustrates an exemplary computer system that facilitates congestion monitoring at a per-queue level, according to one aspect of the application.

FIG. 6 illustrates an exemplary computer system that facilitates congestion monitoring at a per-queue level, according to one aspect of the application. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a congestion-monitoring system 620, and data 650.

Congestion-monitoring system 620 can include instructions, which when executed by computer system 600, can cause computer system 600 or processor 602 to perform methods and/or processes described in this disclosure. Specifically, congestion-monitoring system 620 can include instructions for determining whether a triggering condition is met (triggering-condition-determination instructions 622), instructions for generating seed packets (seed-packet-generation instructions 624), instructions for configuring a replication list (replication-list-configuration instructions 626), instructions for configuring the packet replication rate (replication-rate-configuration instructions 628), instructions for reserving a VLAN (VLAN-reservation instructions 630), instructions for configuring a tunnel table (tunnel-table-configuration instructions 632), instructions for configuring a recirculation port (recirculation-port configuration instructions 634), instructions for configuring an L2 forwarding table (forwarding-table-configuration instructions 636), instructions for monitoring per-queue counters (counter-monitoring instructions 638), and instructions for analyzing states of individual queues (queue-state-analyzing instructions 640).

In general, this disclosure provides a solution to the problem of generating internal traffic in a switch that can be used to monitor the congestion state of the switch at the per-queue level and to determine connectivity among the ports. Instead of using software to generate all internal packets, the disclosed solution uses software to generate seed packets that can be replicated by hardware logic (e.g., a packet replication unit) in each line card. Such a packet replication unit has been conventionally used for multicasting or L2 replication purposes. To achieve the per-queue level granularity, multiple seed packets can be generated (one packet for each type of queue). The replication unit maintains a replication list, with entries of the list corresponding to destination ports on the switch. For each entry in the replication list, the replication unit can continue to replicate the seed packets, which can then be forwarded to the destination port. Different replications of different seed packets are targeting different queues of the destination port. Each line card can also implement a plurality of per-queue counters to count the number of internal packets received at each individual queue. These per-queue counters can be monitored by control algorithms running in the line card CPU, which can collect and use this information to check fabric card connectivity and possible congestion in the queues. In addition to monitoring congestion during normal operations of the switch, the internal traffic can also be generated and monitored during switch initialization as an internal BIST to verify the connectivity among the nodes in the switch. This solution can also be used to measure the utilization of the VOQs of each destination port. The internal packets can be used to determine if a VOQ is discarding traffic because it is full or saturated. Determining the utilization of the VOQs can allow the system administrator to take remedial actions (e.g., rate adjustment or traffic rebalance) in cases where the utilization of one or more VOQs is not desired. It is also possible to generate switch internal traffic for purposes other than monitoring congestion and connectivity in the multi-node switch system.

One aspect of the instant application provides a system and method for generating internal traffic for a switch. During operation, the system configures a replication list comprising a plurality of replication entries, with a respective replication entry corresponding to a destination port on the switch. The system generates a seed packet to be replicated for each replication entry in the replication list, with a destination address of a respective replicated packet corresponding to a replication entry. All replicated packets are associated with a virtual local-area network (VLAN) reserved for the internal traffic. The system then forwards the replicated packets along with external packets received by the switch to corresponding destination ports on the switch.

In a variation on this aspect, a respective destination port supports multiple queues, and the system generates multiple seed packets, one for each queue.

In a further variation, the multiple queues are priority queues; the seed packet comprises an internal header indicating a type of priority queue that is targeted by packets replicated based on the seed packet; and replicating the seed packet comprises removing the internal header and priority tagging the replicated packet.

In a further variation, the system further receives a counter value from a per-queue counter that counts a number of packets received at a particular port for a particular queue, and determines a state of the particular queue based on the counter value.

In a variation on this aspect, the switch comprises multiple interconnected nodes, and the respective replication entry specifies a unique {node, port} combination.

In a variation on this aspect, forwarding the replicated packets comprises configuring an internal recirculation port to insert the replicated packets into a packet-processing pipeline to allow the replicated packets to be processed similarly as the external packets.

In a further variation, the system configures a tunnel table that includes a plurality of tunnel entries, with a respective tunnel entry corresponding to a replication entry. All tunnel entries point to the recirculation port, thus facilitating tunneling of the replicated packets to the internal recirculation port.

In a variation on this aspect, configuring the replication list comprises adjusting a rate that the seed packet is replicated based on traffic load on the switch.

In a variation on this aspect, configuring the replication list comprises disabling a replication entry in the replication list to stop replication of the seed packet for the disabled replication entry.

In a variation on this aspect, the system continuously replicates the seed packet until an interruption condition is met.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-executed method for generating internal traffic for a switch, the method comprising:
   configuring a replication list comprising a plurality of replication entries, wherein a respective replication entry corresponds to a destination port on the switch;
   generating a seed packet to be replicated for each replication entry in the replication list, wherein a destination address of a respective replicated packet corresponds to a replication entry, and wherein all replicated packets are associated with a virtual local-area network (VLAN) reserved for the internal traffic;
   forwarding the replicated packets along with external packets received by the switch to corresponding destination ports on the switch, wherein forwarding the replicated packets comprises configuring an internal recirculation port to insert the replicated packets into a packet-processing pipeline to allow the replicated packets to be processed similarly as the external packets; and
   configuring a tunnel table that includes a plurality of tunnel entries, wherein a respective tunnel entry corresponds to a replication entry, and wherein all tunnel entries point to the internal recirculation port, thus facilitating tunneling of the replicated packets to the internal recirculation port.

2. The method of claim 1, wherein a respective destination port supports multiple queues, and wherein the method further comprises generating multiple seed packets, one for each queue.

3. The method of claim 2, wherein the multiple queues are priority queues, wherein the seed packet comprises an internal header indicating a type of priority queue that is targeted by packets replicated based on the seed packet, and wherein replicating the seed packet comprises removing the internal header and priority tagging the replicated packet.

4. The method of claim 2, further comprising:
   receiving a counter value from a per-queue counter that counts a number of packets received at a particular port for a particular queue; and
   determining a state of the particular queue based on the counter value.

5. The method of claim 1, wherein the switch comprises multiple interconnected nodes, and wherein the respective replication entry specifies a unique {node, port} combination.

6. The method of claim 1, wherein configuring the replication list comprises adjusting a rate that the seed packet is replicated based on traffic load on the switch.

7. The method of claim 1, wherein configuring the replication list comprises disabling a replication entry in the replication list to stop replication of the seed packet for the disabled replication entry.

8. The method of claim 1, further comprising continuously replicating the seed packet until an interruption condition is met.

9. A computer system, comprising:
   a processor; and
   a memory coupled to the processor and storing instructions which, when executed by the processor, cause the processor to perform a method for generating internal traffic, the method comprising:
      configuring a replication list comprising a plurality of replication entries, wherein a respective replication entry corresponds to a destination port on a switch;
      generating a seed packet to be replicated for each replication entry in the replication list, wherein a destination address of a respective replicated packet corresponds to a replication entry, and wherein all replicated packets are associated with a virtual local-area network (VLAN) reserved for the internal traffic;
      forwarding the replicated packets along with external packets received by the switch to corresponding destination ports on the switch, wherein forwarding the replicated packets comprises configuring an internal recirculation port to insert the replicated packets into a packet-processing pipeline to allow the replicated packets to be processed similarly as the external packets; and
      configuring a tunnel table that includes a plurality of tunnel entries, wherein a respective tunnel entry corresponds to a replication entry, and wherein all tunnel entries point to the internal recirculation port, thus facilitating tunneling of the replicated packets to the internal recirculation port.

10. The computer system of claim 9, wherein a respective destination port supports multiple queues, and wherein the method further comprises generating multiple seed packets, one for each queue.

11. The computer system of claim 10, wherein the multiple queues are priority queues, wherein the seed packet comprises an internal header indicating a type of priority queue that is targeted by packets replicated based on the seed packet, and wherein replicating the seed packet comprises removing the internal header and priority tagging the replicated packet.

12. The computer system of claim 10, wherein the method further comprises:
    receiving a counter value from a per-queue counter that counts a number of packets received at a particular port for a particular queue; and
    determining a state of the particular queue based on the counter value.

13. The computer system of claim 9, wherein the switch comprises multiple interconnected nodes, and wherein the respective replication entry specifies a unique {node, port} combination.

14. The computer system of claim 9, wherein configuring the replication list comprises adjusting a rate that the seed packet is replicated based on traffic load on the switch.

15. The computer system of claim 9, wherein configuring the replication list comprises disabling a replication entry in the replication list to stop replication of the seed packet for the disabled replication entry.

16. The computer system of claim 9, wherein the method further comprises continuously replicating the seed packet until an interruption condition is met.

\* \* \* \* \*